Figure 1:
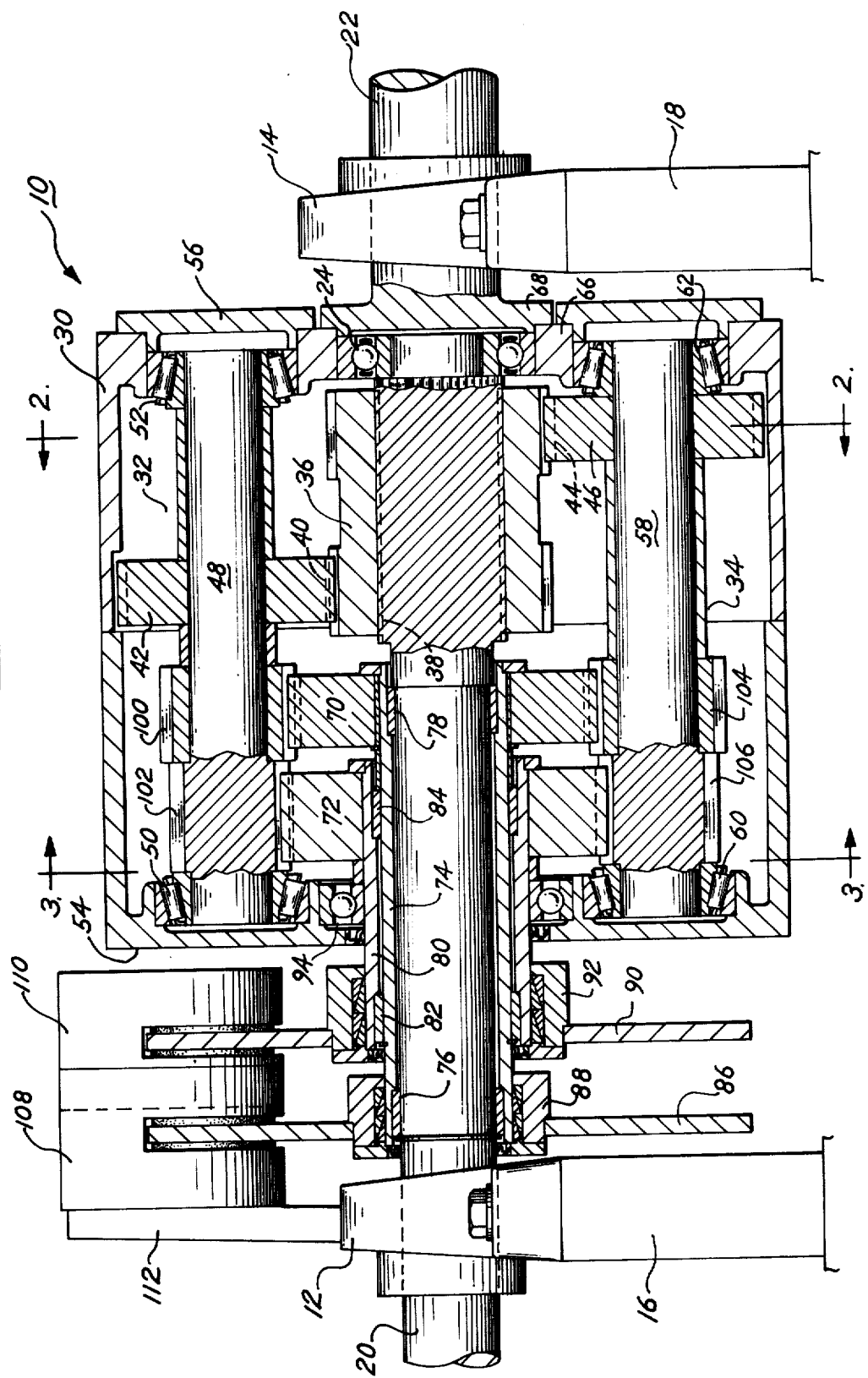

United States Patent [19]

Chung

[11] 4,189,962
[45] Feb. 26, 1980

[54] MULTIPLE SPEED GEAR REDUCER
[75] Inventor: Jackson Chung, Mishawaka, Ind.
[73] Assignee: Reliance Electric Company, Mishawaka, Ind.
[21] Appl. No.: 769,057
[22] Filed: Feb. 16, 1977
[51] Int. Cl.$^2$ .............................................. F16H 1/28
[52] U.S. Cl. .................................. 74/802; 74/801; 74/866
[58] Field of Search ..................... 74/801, 802, 866

[56] References Cited
U.S. PATENT DOCUMENTS

| | | | |
|---|---|---|---|
| 2,703,021 | 3/1955 | Stoeckicht | 74/801 |
| 2,794,350 | 6/1957 | Hart | 74/802 |
| 3,572,171 | 3/1971 | Larsson | 74/801 |
| 3,599,512 | 8/1971 | Wayman | 74/801 |
| 3,969,950 | 7/1976 | Rau et al. | 74/801 |

*Primary Examiner*—Benjamin Wyche
*Assistant Examiner*—James Yates
*Attorney, Agent, or Firm*—Marmaduke A. Hobbs

[57] ABSTRACT

A multiple speed gear reducer embodying the present invention includes a power input shaft and a power output shaft, a plurality of load sharing gear trains interconnecting said input and output shafts, and two or more reaction gears of different sizes coaxially arranged on the input shaft and operatively connected to the gear train or trains for producing relative rotation between said gear train or trains and the input shaft. A clutch for each of said reaction gears selectively restrains the gears to obtain a predetermined gear reduction ratio between the input and the output shafts. The reaction gears are mounted on separate, coaxially arranged sleeves around the input shaft and are controlled through clutches on the sleeves to obtain a selected gear ratio.

6 Claims, 3 Drawing Figures

MULTIPLE SPEED GEAR REDUCER

The conventional gear reducers for industrial applications are of the single speed type consisting essentially of an input shaft on one side, an output shaft on the other side, and a fixed housing containing reduction gears interconnecting the two shafts. The housing, which encloses and supports the gearing between the shafts, is normally secured to a rigid base and forms the reaction member for the torque transmitted between the two shafts. Multiple speed power transmissions, which often include gear reducers, are extensively used in the vehicular field, and are specially designed and constructed for that particular application. These are frequently of the gear shifting type, either manual or automatic; however, clutch operated reaction types have been extensively used in the vehicular field to vary the gear ratio between the engine and drive shaft. The foregoing vehicular types of speed changing mechanisms have not been utilized effectively in most instances in industrial installations, primarily because they are unduly complex, large and expensive, and/or are unreliable for extended periods of operation for driving machinery and other equipment under heavy loads. Instead, speed changing involving gear reducers has principally been accomplished in the industrial field by using multiple or variable speed electric motors to drive the equipment through single gear ratio reducers. It is therefore one of the principal objects of the present invention to provide a multiple speed gear reducer for industrial and commercial applications, which can easily and readily be shifted between various gear ratios, while the gear reducer is either operative or inoperative, and which is simple in construction and operation.

Another object of the invention is to provide a multiple speed gear reducer having a torque input member, a torque output member, and multiple reaction members, any one of which can be selected at any stage of operation to provide the desired speed reduction without changing the speed of the driving motor, and which operates effectively and efficiently in any selected speed for extended periods of time.

Still another object of the invention is to provide a multiple speed gear reducer which may be driven by a single speed motor and yet is capable of providing a soft start and slow acceleration of the equipment with any gear ratio selected, and which can be shifted to either a higher or lower gear ratio at any time during acceleration.

A further object is to provide a speed reducer of the aforementioned type which includes a plurality of load sharing gear trains adaptable to various sizes and capacities over a wide range of reducers, and which, because of its versatility in design, construction and operation, can be used in special applications without changing the basic gear reduction and shifting mechanism.

Figure 2:
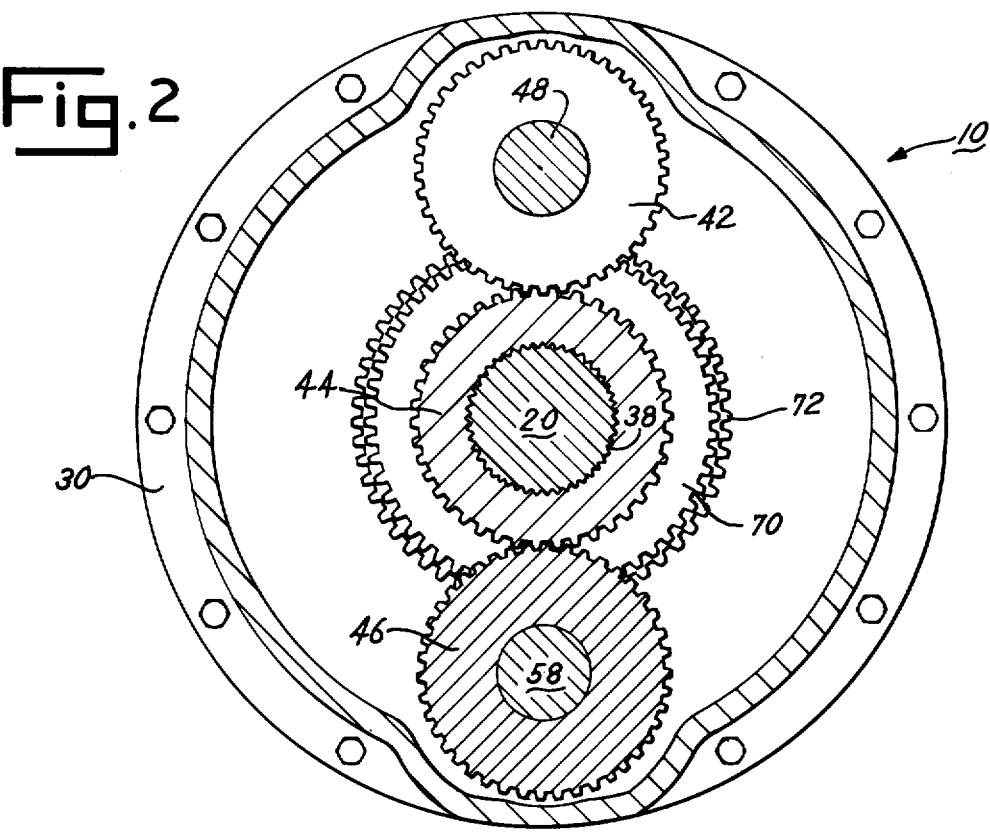
Figure 3:
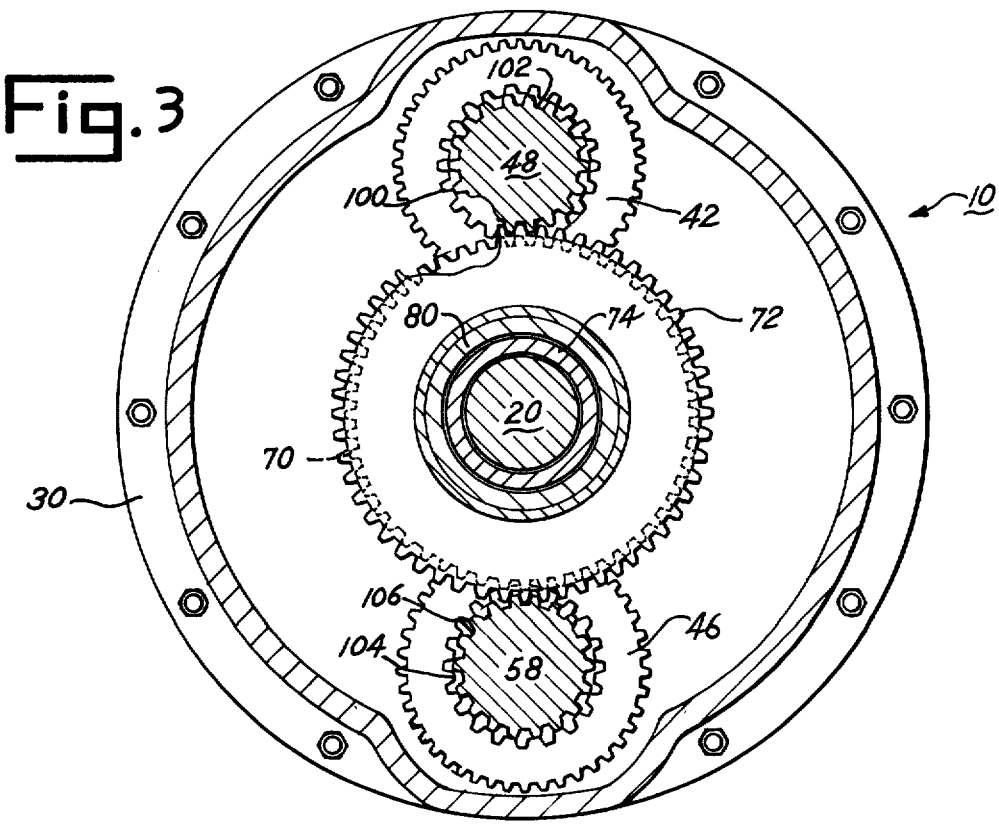

The multiple speed gear reducer embodying the present invention consists broadly of a torque input member and a torque output member, which are normally input and output shafts, and a reaction member having a plurality of reaction gears controlled by separate clutches for selecting a particular reaction gear and thereby selecting the gear ratio to give the desired torque output. The gearing in the reducer is preferably of the external type and includes a load sharing multiple path arrangement between the input and output members, such as that disclosed in my copending application Ser. No. 722,026, filed Sept. 10, 1976, now U.S. Pat. No. 4,056,018, issued Nov. 1, 1977, although the present concept is not limited to any particular type of reducer or gear arrangement. The reaction gears are preferably controlled by clutches which can gradually be restrained to provide a smooth start during acceleration and a smooth transition between reaction gears when the gear ratios are changed during operation. A clutch capable of giving satisfactory performance for both starting and speed changing operations, is disclosed in copending application Ser. No. 667,022, filed Mar. 15, 1976, common assignee, now U.S. Pat. No. 4,047,452, issued Sept. 13, 1977. The present concept is particularly applicable to gear reducers for industrial and commercial installations for driving a variety of different machines and types of equipment. The invention will be more fully understood from the following description and accompanying drawings, wherein:

FIG. 1 is a longitudinal cross sectional view of a gear reducer embodying the present invention, with the housing or cover removed therefrom;

FIG. 2 is a transverse cross sectional view of the gear reducer shown in FIG. 1, the section being taken on line 2—2 of FIG. 1; and FIG. 3 is a transverse cross sectional view of the gear reducer shown in FIGS. 1 and 2, the section being taken on line 3—3 of FIG. 1.

Referring more specifically to the drawings, and to FIG. 1 in particular, numeral 10 indicates generally a speed reducer embodying the present invention, mounted on pillow blocks 12 and 14 disposed at opposite ends of the gear reducer and supported on suitable bases 16 and 18, respectively. The gear reducer is driven by an electric motor or other suitable source of power connected to input shaft 20, and the reducer is adapted to drive a piece of machinery or other equipment through output shaft 22, by either a coupling, chain, or belt (not shown), connecting the shaft to the equipment. Various arrangements may be made to adapt the gear reducer to a variety of different types of machines and equipment.

The power input shaft 20, which is journaled at one end in pillow block 12, extends substantially the full length of the gear reducer and is journaled at the other end in a bearing 24 mounted in carrier 30, the carrier being supported on the left hand side, as seen in FIG. 1, by the input shaft, and on the right hand side by output shaft 22 journaled in pillow block 14. The two shafts are operatively connected to one another only through carrier 30 and the reduction gearing therein. The input forces of shaft 20 are transmitted to carrier 30 through two power trains indicated generally by numerals 32 and 34, the trains being disposed diametrically opposite to one another in the carrier with respect to the axes of the input and output shafts, to provide a concentric and balanced operating unit, as seen in FIGS. 2 and 3.

The two gear trains 32 and 34 are driven by the input shaft through a dual pinion 36 connected to the input shaft by a spline 38 on the inner end of the input shaft; thus, the dual pinion is permitted to shift axially during operation to balance its position relative to the two gear trains 32 and 34, thereby distributing the load equally between the two gear trains. Gear train 32 is driven by pinion 40 which meshes with large gear 42, and gear train 34 is driven by pinion 44 which meshes with large gear 46. Gear 42 is rigidly mounted on shaft 48, which is journaled at its opposite ends in bearings 50 and 52 mounted in end members 54 and 56 of carrier 30, and gear 46 is rigidly mounted on shaft 58 which is journaled at opposite ends in bearings 60 and 62 in the two end members of the carrier 30. The two pinions are provided with helical gears of opposite angles in order to assist in dividing the forces from the input shaft equally between the two power trains 32 and 34, so that each carries the same load in transmitting the forces from the input shaft to the carrier. Output shaft 22 is secured to end 56 of the carrier by a ring 66 which is rigidly connected to flange 68 of shaft 22 and to end 56 to form a rigid connection between the carrier and shaft 22 for transmitting the forces between the two elements. While only two gear trains are shown, three or more gear trains equally spaced around the axis of the input and output shafts may be used if operating conditions require a greater distribution of the load between the input and output shafts and the reaction elements.

Small and large reaction gears 70 and 72 are mounted on input shaft 20, gear 70 being secured to a sleeve 74 journaled on bearings 76 and 78 on shaft 20 and extending coaxially on shaft 20 outwardly beyond one end of carrier 30. Large gear 72 is rigidly mounted on a sleeve 80 which is disposed coaxially with respect to input shaft 20 and sleeve 74, and mounted on bearings 82 and 84 disposed between the two sleeves. Thus the two sleeves are rotatable relative to one another and to shaft 20. Mounted on the outer end of sleeve 74 is a clutch plate 86 which is rigidly secured to the sleeve by a hub 88, and a clutch plate 90 is rigidly mounted on the outer end of sleeve 80 and secured thereto by a hub 92. Gear 70, sleeve 74, and clutch plate 86 rotate in unison, and gear 72, sleeve 80, and clutch plate 90 likewise rotate in unison. The sleeve 80 supports bearing 94 on which the left hand end of carrier 30 is mounted, permitting the carrier to rotate relative to the two sleeves and the input shaft.

Pinions 100 and 102, which are rigidly mounted on shaft 48, mesh with reaction gears 70 and 72, respectively, and pinions 104 and 106, which are rigidly mounted on shaft 58, also mesh with reaction gears 70 and 72, respectively. The operation of the two clutches 86 and 90 is controlled by electrically operated caliper heads 108 and 110 and is controlled so that only one of the caliper heads can be energized at any given time, thus selectively operating reaction gears 70 and 72 to obtain a predetermined gear reduction between the input and output shafts. The two caliper heads are supported by an arm 112 or some other suitable support means, such as the housing or base, which holds the heads firmly in place when either head is energized. The construction of the caliper heads may be considered conventional and of well known construction, consisting of electrical magnets with frictional material which engages the side of the respective clutch plate to restrain the rotation of the plate when the magnet of the respective head is energized.

In the operation of the multiple speed gear reducer just described, the input shaft 20 is driven by a suitable source of power, such as an electric motor, thereby driving dual pinion 36, which in turn drives gear trains 32 and 34. If neither of the two caliper heads is energized and engaging the clutch plates 86 and 90, the two plates rotate freely, and carrier 30 and output shaft 22 do not rotate. In this operating condition, both gear trains and the two reaction gears rotate freely as they are driven by the input shaft. When the equipment is to be driven by the gear reducer, a particular gear ratio is selected by energizing the appropriate caliper head, for the selected reaction gear, for example gear 70. Upon energizing head 108, clutch plate 86 is restrained and ultimately prevented from rotating. Since the clutch plate is rigidly secured to sleeve 74, and the sleeve in turn is rigidly secured to reaction gear 70, the reaction gear is held in a fixed position. This causes the pinions 100 and 104 of gear trains 32 and 34 to traverse the periphery of gear 70 and, since the two shafts 48 and 58 of the two gear trains are journaled in carrier 30, carrier 30 rotates and drives output shaft 22, the shaft and carrier continuing to rotate in unison as long as the clutch plate 86 is held stationary by the action of caliper head 108. In this operation the input force is divided equally between the two gear trains, and as the gear trains orbit the input shaft, the carrier and output shaft rotate to drive a machine or other equipment.

In the event a different r.p.m. of output shaft 22 is desired for a given motor r.p.m., clutch plate 86 is released by caliper head 108, thus permitting reaction gear 70 to rotate freely, and in so doing, it no longer operates as a reaction member for pinions 100 and 104 of gear trains 32 and 34. Clutch plate 90 is then engaged by caliper head 110, and since clutch plate 90 is connected rigidly by sleeve 80 to gear 72, which is of a larger diameter than gear 70, and gears 102 and 106 are of a smaller diameter than gears 100 and 104, the two gear trains orbit at a slower speed and the carrier and output shaft rotate at a new and lower r.p.m. When one reaction gear is held by the respective clutch plate and head so that it forms the reaction element, the other reaction gear and respective sleeve and clutch plate rotate freely, and hence do not interfere with the operation of the gear which is performing the reaction function.

It is seen from the foregoing that a multiple path, load sharing arrangement in combination with a multiple speed gear reducer results in a compact construction capable of handling substantially larger loads than most gear reducers of comparable size. Although only two reaction gears have been illustrated, it is apparent that three or more such gears may be used if desired. In the structures having additional reaction gears, additional sleeves and clutch plates are required. Further, in place of the magnetically energized caliper heads 108 and 110, hydraulically operated friction elements may be used to restrain the rotation of the clutch plates. The gear train may also contain additional gearing for obtaining other gear ratios between the input and output shafts than those illustrated and described herein. A gear train reduction, such as those disclosed in my copending application Ser. No. 722,026, now U.S. Pat. No. 4,056,018, referred to hereinbefore, may be used if desired.

While only one embodiment of the multiple speed gear reducer has been described herein, various changes and modifications may be made without departing from the scope of the invention.

I claim:

1. A multiple speed gear reducer comprising a torque input element, a torque output element disposed in end-to-end relation with said input element, two gear reduction trains operatively disposed between said input and output elements, means supporting said gear trains for orbital movement about the axis of said input element, a pair of reaction gears at least one of which is disposed concentrically with respect to said input element and radially outwardly therefrom, pinions in said gear trains for each of said reaction gears, first sleeve means disposed concentrically with respect to said input element and connected to one of said reaction gears, second sleeve means disposed coaxially with respect to said first sleeve and connected to the other of said reaction gears, clutch means connected to said sleeves and having rotating means, and means for selectively restraining the rotation of said rotating means to obtain a predetermined gear reduction between said input and output elements, said means supporting said gear trains consisting of a rotatable carrier having end members, said gear trains including shafts parallel with said input element and journaled in said end members, and said output element consisting of a shaft extending axially outwardly from one end of one of said end members.

2. A multiple speed gear reducer as defined in claim 1 in which said input and output shafts are arranged coaxially with respect to one another, and means connects said output shaft to said carrier means for rotation therewith.

3. A multiple speed gear reducer as defined in claim 1 in which said reaction gears are of different sizes.

4. A multiple speed gear reducer as defined in claim 2 in which said clutch means includes rotatable discs connected to the respective sleeve means controlling the reaction gear to which the sleeve means is connected, and said means for restraining the rotation of said disc consists of caliper heads for frictionally engaging the respective discs.

5. A multiple speed gear reducer as defined in claim 1 in which said input and output elements are arranged coaxially with respect to one another, and in which said gear trains are disposed diametrically opposite to one another with respect to said input element.

6. A multiple speed gear reducer as defined in claim 1 in which a dual pinion is mounted on and connected by a spline to said input element and has a pair of gear teeth thereon with helical gearing of opposite angles for driving said gear trains.

* * * * *